US008353007B2

(12) United States Patent
Gordon

(10) Patent No.: US 8,353,007 B2
(45) Date of Patent: Jan. 8, 2013

(54) SYSTEMS AND METHODS FOR IDENTIFYING A NETWORK

(75) Inventor: John Gordon, Alameda, CA (US)

(73) Assignee: Devicescape Software, Inc., San Bruno, CA (US)

( * ) Notice: Subject to any disclaimer, the term of this patent is extended or adjusted under 35 U.S.C. 154(b) by 400 days.

(21) Appl. No.: 12/578,532

(22) Filed: Oct. 13, 2009

(65) Prior Publication Data

US 2010/0095359 A1    Apr. 15, 2010

Related U.S. Application Data

(60) Provisional application No. 61/104,995, filed on Oct. 13, 2008.

(51) Int. Cl.
*H04L 9/32* (2006.01)
(52) U.S. Cl. .................. 726/2; 726/3; 726/4; 726/5
(58) Field of Classification Search .................. 726/1–6, 726/10–13; 713/150, 154–156; 709/219–220, 709/223–225, 229
See application file for complete search history.

(56) References Cited

U.S. PATENT DOCUMENTS

| 6,151,628 | A | 11/2000 | Xu et al. |
|---|---|---|---|
| 6,161,185 | A | 12/2000 | Guthrie et al. |
| 6,233,577 | B1 | 5/2001 | Ramasubramani et al. |
| 6,799,038 | B2 | 9/2004 | Gopikanth |
| 6,822,955 | B1 | 11/2004 | Brothers et al. |
| 6,871,284 | B2 | 3/2005 | Cooper et al. |
| 6,892,230 | B1 * | 5/2005 | Gu et al. ............... 709/220 |
| 6,961,857 | B1 | 11/2005 | Floryanzia |
| 7,286,113 | B1 | 10/2007 | Lapstun et al. |
| 7,360,087 | B2 | 4/2008 | Jorgensen et al. |
| 7,395,083 | B2 | 7/2008 | Buckley |
| 7,409,543 | B1 | 8/2008 | Bjorn |
| 7,437,755 | B2 | 10/2008 | Farino et al. |
| 7,457,950 | B1 | 11/2008 | Brickell et al. |
| 7,469,139 | B2 | 12/2008 | van de Groenendaal |
| 7,568,220 | B2 | 7/2009 | Burshan |
| 7,661,128 | B2 | 2/2010 | Chen et al. |
| 7,685,264 | B2 | 3/2010 | Tumsi Dayakar et al. |

(Continued)

FOREIGN PATENT DOCUMENTS

JP    2003196241    7/2003

(Continued)

OTHER PUBLICATIONS

PCT International Search Report and Written Opinion dated Nov. 20, 2009 for International Application No. PCT/US2009/060532, 10 pages.

(Continued)

*Primary Examiner* — Hosuk Song
(74) *Attorney, Agent, or Firm* — Sheppard, Mullin, Richter & Hampton LLP

(57) ABSTRACT

Exemplary systems and methods for identifying a wireless network are provided. In exemplary embodiments, a method includes at least a digital device receiving network information associated with a network, generating an access identifier based on the network information, generating a credential request including the access identifier, providing the credential request to a credential server, receiving a credential request response from the credential server, the credential request response comprising network credentials to access the network, and providing the network credentials to a network device to access the network.

33 Claims, 10 Drawing Sheets

U.S. PATENT DOCUMENTS

| | | | |
|---|---|---|---|
| 7,827,252 B2 * | 11/2010 | Hopmann et al. ............ | 709/217 |
| 7,898,977 B2 | 3/2011 | Roese et al. | |
| 7,920,531 B2 | 4/2011 | Gupta et al. | |
| 7,930,384 B1 | 4/2011 | Lester et al. | |
| 8,005,218 B2 * | 8/2011 | Keeler et al. ................. | 380/249 |
| 8,074,259 B1 | 12/2011 | Levy et al. | |
| 2001/0034837 A1 | 10/2001 | Kausik et al. | |
| 2002/0194501 A1 | 12/2002 | Wenocur et al. | |
| 2002/0199096 A1 | 12/2002 | Wenocur et al. | |
| 2003/0004994 A1 | 1/2003 | Kamrowski et al. | |
| 2003/0097592 A1 | 5/2003 | Adusumilli | |
| 2003/0135765 A1 | 7/2003 | Hind et al. | |
| 2003/0169713 A1 | 9/2003 | Luo | |
| 2003/0188201 A1 | 10/2003 | Venkataramappa | |
| 2003/0204748 A1 | 10/2003 | Chiu | |
| 2003/0217137 A1 | 11/2003 | Roese et al. | |
| 2004/0003060 A1 | 1/2004 | Asoh et al. | |
| 2004/0003081 A1 | 1/2004 | Justus et al. | |
| 2004/0031058 A1 | 2/2004 | Reisman | |
| 2004/0103282 A1 | 5/2004 | Meier et al. | |
| 2004/0105433 A1 | 6/2004 | Seo | |
| 2004/0122959 A1 | 6/2004 | Lortz | |
| 2004/0162818 A1 | 8/2004 | Shaw | |
| 2004/0168090 A1 | 8/2004 | Chawla et al. | |
| 2005/0059416 A1 | 3/2005 | Ono | |
| 2005/0066033 A1 | 3/2005 | Cheston et al. | |
| 2005/0097051 A1 | 5/2005 | Madill, Jr. et al. | |
| 2005/0144237 A1 | 6/2005 | Heredia et al. | |
| 2005/0147060 A1 | 7/2005 | Buckley | |
| 2005/0177750 A1 | 8/2005 | Gasparini et al. | |
| 2005/0232189 A1 | 10/2005 | Loushine | |
| 2005/0232209 A1 | 10/2005 | Buckley et al. | |
| 2005/0246431 A1 | 11/2005 | Spitaels | |
| 2005/0260973 A1 | 11/2005 | van de Groenendaal | |
| 2006/0026289 A1 | 2/2006 | Lyndersay et al. | |
| 2006/0047830 A1 | 3/2006 | Nair et al. | |
| 2006/0048213 A1 | 3/2006 | Cheng et al. | |
| 2006/0048214 A1 | 3/2006 | Pennington et al. | |
| 2006/0069782 A1 | 3/2006 | Manning et al. | |
| 2006/0123133 A1 | 6/2006 | Hrastar | |
| 2006/0130140 A1 | 6/2006 | Andreev et al. | |
| 2006/0135155 A1 | 6/2006 | Chung et al. | |
| 2006/0149844 A1 | 7/2006 | Droz et al. | |
| 2006/0174127 A1 | 8/2006 | Kalavade et al. | |
| 2006/0187858 A1 | 8/2006 | Kenichi et al. | |
| 2006/0200503 A1 | 9/2006 | Dosa et al. | |
| 2006/0215622 A1 | 9/2006 | Abdel-Kader et al. | |
| 2006/0221919 A1 | 10/2006 | McRae et al. | |
| 2007/0011725 A1 | 1/2007 | Sahay et al. | |
| 2007/0019670 A1 | 1/2007 | Falardeau | |
| 2007/0054654 A1 | 3/2007 | Jones | |
| 2007/0073817 A1 | 3/2007 | Gorty | |
| 2007/0076612 A1 | 4/2007 | Iyer et al. | |
| 2007/0081477 A1 | 4/2007 | Jakkahalli et al. | |
| 2007/0091861 A1 | 4/2007 | Gupta et al. | |
| 2007/0124490 A1 | 5/2007 | Kalavade et al. | |
| 2007/0127423 A1 | 6/2007 | Ho | |
| 2007/0171910 A1 | 7/2007 | Kumar | |
| 2007/0209065 A1 | 9/2007 | Branam et al. | |
| 2007/0256122 A1 | 11/2007 | Foo et al. | |
| 2007/0270129 A1 | 11/2007 | Luo | |
| 2007/0275701 A1 | 11/2007 | Jonker | |
| 2008/0016230 A1 | 1/2008 | Holtmanns et al. | |
| 2008/0060064 A1 | 3/2008 | Wynn et al. | |
| 2008/0060065 A1 | 3/2008 | Wynn et al. | |
| 2008/0144589 A1 | 6/2008 | Buckley | |
| 2008/0195741 A1 | 8/2008 | Wynn et al. | |
| 2008/0225749 A1 | 9/2008 | Peng et al. | |
| 2009/0024550 A1 | 1/2009 | Wynn et al. | |
| 2009/0028082 A1 | 1/2009 | Wynn et al. | |
| 2009/0031125 A1 | 1/2009 | Bjorn | |
| 2009/0147792 A1 | 6/2009 | Anschutz et al. | |
| 2009/0177801 A1 | 7/2009 | Chambers, Jr. et al. | |
| 2009/0222537 A1 | 9/2009 | Watkins et al. | |
| 2009/0279492 A1 | 11/2009 | Montemurro et al. | |
| 2010/0100951 A1 | 4/2010 | Kutt et al. | |
| 2010/0142484 A1 | 6/2010 | Bachmann et al. | |
| 2010/0275249 A1 | 10/2010 | McCann et al. | |

FOREIGN PATENT DOCUMENTS

| | | |
|---|---|---|
| JP | 2005286783 | 10/2005 |
| WO | 0030285 | 5/2000 |
| WO | 2004097590 | 11/2004 |
| WO | WO2005/096160 | 10/2005 |
| WO | 2010151692 | 12/2010 |

OTHER PUBLICATIONS

Office Action mailed Jul. 22, 2010 from U.S. Appl. No. 12/240,920, filed Sep. 29, 2008.
Office Action mailed May 30, 2008 from U.S. Appl. No. 11/899,739. filed Sep. 6, 2007.
Office Action mailed Aug. 25, 2009 from U.S. Appl. No. 11/899,739, filed Sep. 6, 2007.
Office Action mailed May 17, 2010 from U.S. Appl. No. 11/899,739, filed Sep. 6, 2007.
Office Action mailed Aug. 21, 2009 from U.S. Appl. No. 11/899,697, filed Sep. 6, 2007.
Office Action mailed May 12, 2010 from U.S. Appl. No. 11/899,697, filed Sep. 6, 2007.
Office Action mailed Sep. 1, 2010 from U.S. Appl. No. 11/899,638, filed Sep. 6, 2007.
Office Action mailed Mar. 23, 2011 from U.S. Appl. No. 12/240,920, filed Sep. 29, 2008.
Office Action mailed Dec. 23, 2008 from U.S. Appl. No. 11/899,739, filed Sep. 6, 2007.
Office Action mailed Apr. 6, 2011 from U.S. Appl. No. 11/899,739, filed Sep. 6, 2007.
Notice of Allowance mailed Oct. 31, 2011 from U.S. Appl. No. 11/899,739, filed Sep. 6, 2007.
Office Action mailed Jan. 14, 2011 from U.S. Appl. No. 11/899,697, filed Sep. 6, 2007.
Office Action mailed Apr. 7, 2011 from U.S. Appl. No. 11/899,697, filed Sep. 6, 2007.
Notice of Allowance mailed Nov. 4, 2011 from U.S. Appl. No. 11/899,697, filed Sep. 6, 2007.
Office Action mailed May 4, 2011 from U.S. Appl. No. 11/899,638, filed Sep. 6, 2007.
Office Action mailed May 9, 2011 from U.S. Appl. No. 12/240,969, filed Sep. 29, 2008.
Notice of Allowance mailed Nov. 10, 2011 from U.S. Appl. No. 12/240,969, filed Sep. 29, 2008.
Search Report mailed Feb. 10, 2011 from European Serial No. 07837822.1 filed Sep. 6, 2007.
Search Report mailed Apr. 4, 2011 from European Serial No. 08833721.7 filed Sep. 29, 2008.
Search Report mailed Apr. 1, 2011 from European Serial No. 08834360.3 filed Sep. 29, 2008.
Search Report mailed Feb. 10, 2011 from European Serial No. 07837824.7 filed Sep. 6, 2007.
Search Report mailed Feb. 10, 2011 from European Serial No. 07637823.9 filed Sep. 6, 2007.
Zundt et al. "Seamless Handoff in community Based and Location Aware Heterogeneous Wireless Networks" 6th International Workshop on Mobile Multimedia conference, Oct. 5-8, 2003, pp. 1-5, XP002281321.
PCT International Search Report and Written Opinion dated Mar. 2, 2010 for International Application No. PCT/US2010/021409, 9 pages.
PCT International Search Report and Written Opinion dated Jul. 18, 2008 for International Application No. PCT/US2007/19464, 8 pages.
PCT International Search Report and Written Opinion dated Jun. 12, 2008 for International Application No. PCT/US2007/19462, 6 pages.
PCT International Search Report and Written Opinion dated May 21, 2008 for International Application No. PCT/US2007/19463, 7 pages.
PCT International Search Report and Written Opinion dated Dec. 3, 2008 for International Application No. PCT/US2008/78191, 7 pages.
PCT International Search Report and Written Opinion dated Dec. 8, 2008 for International Application No. PCT/US2008/78198, 10 pages.

Holtmanns et al., U.S. Appl. No. 60/818,517, filed Jul. 6, 2006, referenced in US 2008/0016230, 30 pages.
Search Report and Written Opinion mailed Aug. 11, 2010 from International Serial No. PCT/US2010/039092 filed Jun. 17, 2010.
Search Report and Written Opinion mailed Apr. 26, 2012 from International Serial No. PCT/US2012/025121 filed Feb. 14, 2012.
Search Report and Written Opinion mailed Aug. 30, 2010 from International Serial No. PCT/US2010/039859 filed Jun. 24, 2010.
McCann, Stephen et al., "Novel WLAN Hotspot Authentication," Fifth IEE International Conference on 3G Mobile Communication Technologies, pp. 59-63, Oct. 18, 2004.

* cited by examiner

Credential Request 800

| Location Identifier 802 | Sequence Identifier 804 | Signature 806 | DDID 808 | Access Identifier 810 | Version Identifier 812 |
|---|---|---|---|---|---|

FIG. 8

SYSTEMS AND METHODS FOR IDENTIFYING A NETWORK

CROSS-REFERENCE TO RELATED APPLICATIONS

The present application claims benefit of U.S. Provisional Patent Application No. 61/104,995 filed Oct. 13, 2008, and entitled "Systems and Methods for Identifying a Wireless Network," which is hereby incorporated by reference. The present application is also related to co-pending U.S. patent application Ser. No. 11/899,697, entitled "System and Method for Acquiring Network Credentials," filed Sep. 6, 2007, co-pending U.S. patent application Ser. No. 11/899,739, entitled "System and Method for Providing Network Credentials," filed Sep. 6, 2007, and co-pending U.S. patent application Ser. No. 11/899,638, entitled "System and Method for Obtaining Network Access," filed Sep. 6, 2007, all of which are incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Invention

Embodiments of the present invention are directed to network access and more particularly to identifying and accessing a network.

2. Related Art

Conventionally, hotspots may be established in areas where users are not known in advance. Examples of hotspots may comprise hotels, coffee shops, campuses, and other public or private locations where digital device users may be interested in connecting to a communication network such as the Internet. Typically, these hotspots are wireless.

In many embodiments, the hotspots require the users to be authorized. Thus, the user is typically required to perform a login process before the user's digital device is allowed access to the hotspot. A common login process comprises opening a web browser and connecting to a captive portal website where a user name and password may be entered. Another process may require the user to provide payment information. After confirmation of the payment, an access point will allow the user's digital device access to the hotspot.

Unfortunately, not all digital devices have browser capability. Such digital devices may include, for example, Wi-Fi VoIP phones, cameras, and MP3 players. These digital devices, typically, do not include a web browser or mechanism to enter credentials or payment information. As a result, it is difficult for these digital devices to use hotspots.

One conventional solution to this problem is to pre-configure credentials into the digital device. However, this would require that credentials for all hotspots that the user plans on using be known at the time of configuration. It may also require that the user be registered with, or subscribe to, all the hotspots. Furthermore, new hotspots cannot be accessed by this preconfigured digital device unless the digital device is updated (e.g., downloaded to the digital device over a fully functional network connection). A yet further disadvantage is that the digital device must comprise enough memory to store all the credential information.

SUMMARY OF THE INVENTION

Exemplary systems and methods for identifying a wireless network are provided. In exemplary embodiments, a method comprises receiving, by a digital device, network information associated with a network, generating an access identifier based on the network information, generating a credential request including the access identifier, providing the credential request to a credential server, receiving a credential request response from the credential server, the credential request response comprising network credentials to access the network, and providing the network credentials to a network device to access the network.

The access identifier may comprise an SSID associated with the network. The access identifier may also comprise an IP address. In some embodiments, the method further comprises determining if the IP address is not part of a private non-routable address block and determining to generate the credential request including the IP address based on the determination that the IP address is not part of the private non-routable address block.

The network information comprises XML data. The access identifier may comprise a URL from the XML data and/or a location from the XML data. In some embodiments, generating the access identifier comprises formatting the URL and/or the location. Further, formatting the URL and/or the location may comprise selecting a domain from the URL, removing punctuation from the domain and/or the location, removing white space from the domain and/or the location, and truncating a combination of the URL and/or the location to a limited number of characters.

The network information may comprise a captive portal redirection page. In some embodiments, the access identifier comprises at least a part of a URL from the captive portal redirection page, at least a part of a title from the captive portal redirection page, or both.

An exemplary system may comprise a processor and an access ID module. The processor may be configured to receive network information associated with a network, generate a credential request including the access identifier, provide the credential request to a credential server, receive a credential request response from the credential server, the credential request response comprising network credentials to access the network, and provide the network credentials to a network device to access the network. The access ID module may be configured to generate an access identifier based on the network information.

In various embodiments, an exemplary computer readable medium comprises executable instructions. The instructions may be executable by a processor to perform a method. The method may comprise receiving, by a digital device, network information associated with a network, generating an access identifier based on the network information, generating a credential request including the access identifier, providing the credential request to a credential server, receiving a credential request response from the credential server, the credential request response comprising network credentials to access the network, and providing the network credentials to a network device to access the network.

BRIEF DESCRIPTION OF THE DRAWINGS

FIG. 8 is a block diagram of an exemplary credential request.

DETAILED DESCRIPTION OF EXEMPLARY EMBODIMENTS

Figure 1:
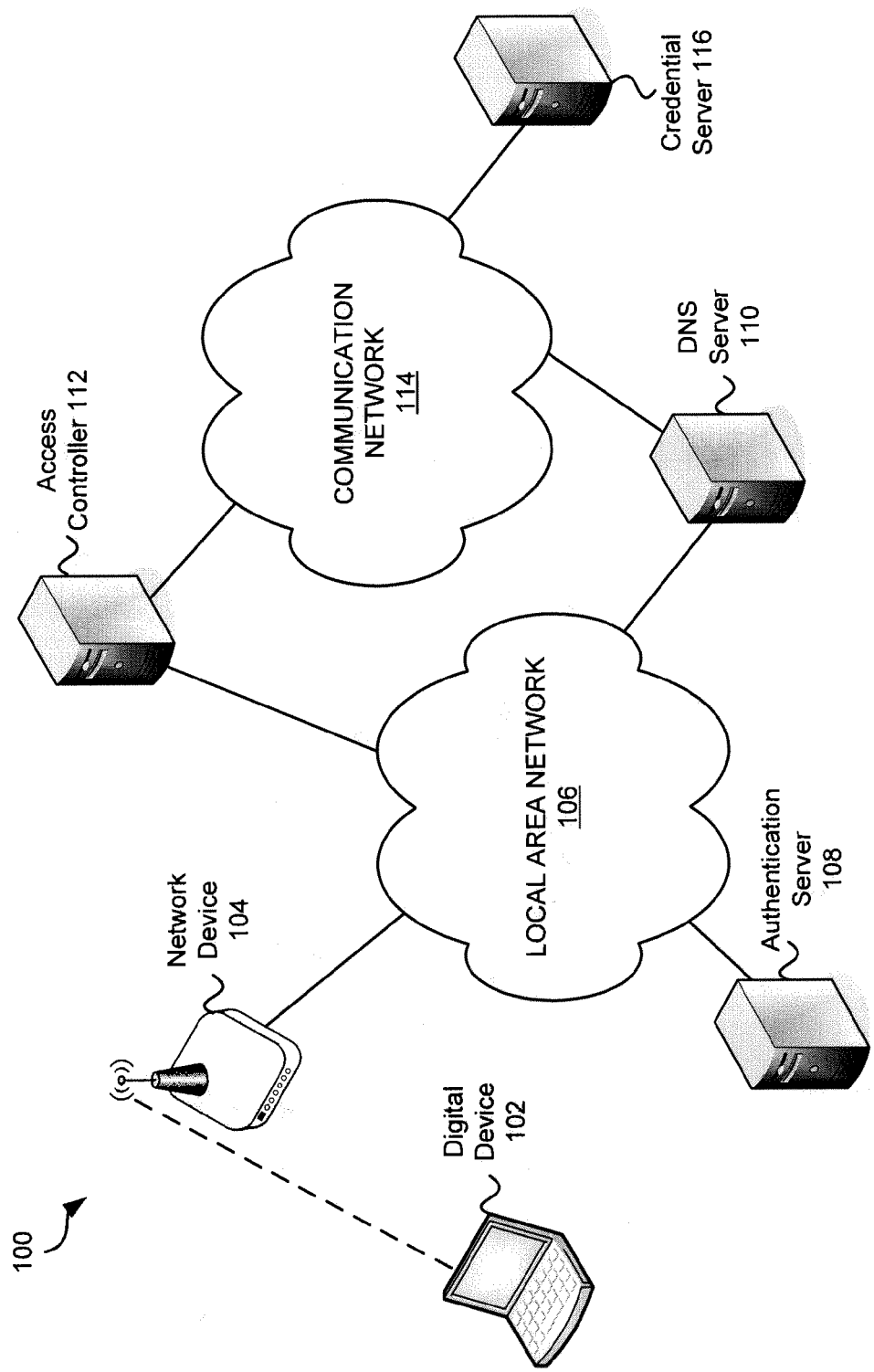
FIG. 1 is a diagram of an environment in which embodiments of the present invention may be practiced.

In order to obtain network credentials to provide to a secured wireless access point for access to a network, the laptop may be configured to receive an access identifier (e.g., SSID) associated with the secured wireless access point and provide the access identifier to a credential server. The credential server may use the access identifier to identify network credential(s) and provide the network credential(s) back to the laptop. The laptop can then provide the network credentials to the secured wireless access point to obtain network access. A network credential is any information (e.g., username, password, certificate, and/or encryption key) necessary to obtain network access. An access identifier is any information that may be used to identify the secured wireless access point, a wireless network associated with the secured wireless access point, and/or a business associated with the secured wireless access point.

In some embodiments, the secured wireless access point may not allow the laptop to send information over the wireless network to a network server until after the secured wireless access point receives the network credential. The laptop may be configured, however, to provide the access identifier, such as an SSID of the secured wireless access point, to the credential server in a DNS message. In one example, the secured wireless access point may be configured to allow the laptop access to a DNS server. The laptop may format the access identifier received from the secured wireless access point in a DNS message which is then directed to the DNS server via the secured wireless access point (e.g., through port 53 or a local DNS proxy). The DNS server may then forward the DNS message to the credential server which may then return the network credentials back to the laptop.

Unfortunately, there are cases in which an SSID is not available from the secured wireless access point (e.g., the SSID is not available or cannot be obtained). In various embodiments, the access identifier may still be obtained or generated from the secured wireless access point. In various embodiments, the access identifier may comprise an IP address or information from a captive portal redirection page. A captive portal redirection page is any web page that is provided to the laptop prior to access to the network being granted. The IP address may be the IP address associated with the secured wireless access point and/or a DNS resolver. The captive portal redirection page may comprise an XML data and/or other information which may be used as an access identifier.

In some embodiments, a WISPr network may provide a redirection page that comprises XML data which contains information that may be used to generate the access identifier.

In some examples, the XML data may contain a URL and/or a name of a location. The laptop may extract the domain name for the URL to generate the access identifier. The laptop may also combine the URL and location name to generate the access identifier.

Alternately, if the XML data is unavailable (e.g., the network is not a WISPr network) a domain portion of the redirection target within the captive portal redirection page may be used to generate the access identifier. Alternately, an HTML title text of the page being redirected to may also be used. Further, in some embodiments, the laptop may combine the domain portion and the HTML title text to generate the access identifier.

FIG. 1 illustrates a diagram of an environment 100 in which embodiments of the present invention may be practiced. In exemplary embodiments, a user with a digital device 102 enters a hotspot. The digital device 102 may automatically transmit a credential request as a standard protocol over a network device 104. The credential request may be forwarded to a credential server 116 which, based on the information contained within the credential request, transmits a credential request response back to the digital device 102. The credential request response contains network credentials which the digital device 102 may provide to the network device 104, the authentication server 108, or the access controller 112 to obtain access to the communication network 114.

In various embodiments, a hotspot comprises the network device 104, the authentication server 108, the DNS server 110, and the access controller 112 which are coupled to the local area network 106 (e.g., a "walled garden"). The network device 104 may comprise an access point which allows the digital device 102 to communicate with the authentication server 108, the DNS server 110, and the access controller 112 over the local area network 106. The digital device 102 may comprise a laptop, mobile phone, camera, personal digital assistant, or any other computing device. The authentication server 108 is a server that requires network credentials from the digital device 102 before allowing the digital device 102 access to communicate over the communication network 114. The network credentials may comprise a username, password, and login procedure information. The DNS server 110 provides DNS services over the local area network 106 and may relay requests to other DNS servers (not shown) across the communication network 114. The access controller 112 is an access device such as a router or bridge that can allow communication between devices operationally coupled to the network device 104 with devices coupled to the communication network 114.

Although the hotspot in FIG. 1 depicts separate servers coupled to the local area network 106, those skilled in the art will appreciate that there may be any number of devices (e.g., servers, digital devices, access controllers, and network devices) coupled to the local area network 106. In some embodiments, the local area network 106 is optional. In one example, the authentication server 108, the DNS server 110, and the access controller 112 are coupled directly to the network device 104. In various embodiments, the authentication server 108, the DNS server 110, and the access controller 112 may be combined within one or more servers or one or more digital devices. Further, although FIG. 1 depicts wireless access, the digital device 102 may be coupled to the network device 104 wirelessly or over wires (such as 10baseT).

In order to access the communication network 114, the authentication server 108 may require the digital device 102 to provide one or more network credentials for access to the hotspot. The network credential may comprise, for example, a username and password for an account associated with the hotspot. In alternative embodiments, network credentials other than a user name and password may be utilized.

According to exemplary embodiments, the digital device 102 may dynamically acquire the network credentials from the credential server 116. The digital device 102 may send a credential request comprising an identity of the digital device 102 (or the user of the digital device 102) and details about the network device 104 (e.g., name of the network device 104 or Wi-Fi service provider) such as an access identifier to the credential server 116.

In one example, when the digital device 102 enters the hotspot, the network device 104 may provide an IP address to which DNS queries may be submitted, for example, via DHCP (Dynamic Host Configuration Protocol). The credential request may be formatted as a standard protocol. In an example, the credential request may be formatted as a DNS request. The credential request may be a text record request (e.g., TXT), which comprises a standard record type such that the network infrastructure (e.g., the access controller 112) will not block the request.

In some embodiments, the credential request is received by the DNS server 110 which may forward the credential request to the credential server 116 for the network credential. In exemplary embodiments, the credential server 116 may perform a lookup to determine the proper network credential(s) to send back to the DNS server 110 which forwards the network credential back to the requesting digital device 102. In various embodiments, the proper network credential(s) are sent from the credential server 116 to the digital device 102 over the same path as the transmission of the credential request.

More details regarding the process for determining and providing the network credentials at the credential server 116 are provided in co-pending U.S. patent application Ser. No. 11/899,739, entitled "System and Method for Providing Network Credentials," filed Sep. 6, 2007. Although only one DNS server 110 is depicted within FIG. 1, the credential request may be forwarded through any number of servers, including but not limited to DNS servers, prior to being received by the credential server 116. In other embodiments, the credential request is forwarded directly from the network device 104 to the credential server 116.

In some embodiments, a credential request response from the credential server 116 may comprise the username, password and/or login procedure information. The login procedural information may comprise, for example, HTML form element names, submission URL, or submission protocol. In some embodiments, the network credential response may be encrypted by the credential server 116 using an encryption key associated with the digital device 102 prior to transmission back to the digital device 102.

Once the digital device 102 receives the network credential response, the digital device 102 may submit the network credential (retrieved from the network credential response) to the network device 104 in an authentication response. In exemplary embodiments, the authentication response may be forwarded to an authentication server 108 for verification. In some embodiments, the authentication server 108 may comprise an AAA server or RADIUS server.

It should be noted that FIG. 1 is exemplary. Alternative embodiments may comprise more, less, or functionally equivalent components and still be within the scope of present embodiments. For example, as previously discussed, the functions of the various servers (e.g., DNS server 110, credential server 116, and authentication server 108) may be combined into one or two servers. That if, for example, the authentication server 108 and the DNS server 110 may comprise the same server, or the functionality of the authentication server 108, the DNS server 110, and the access controller 112 may be combined into a single device.

Figure 2:
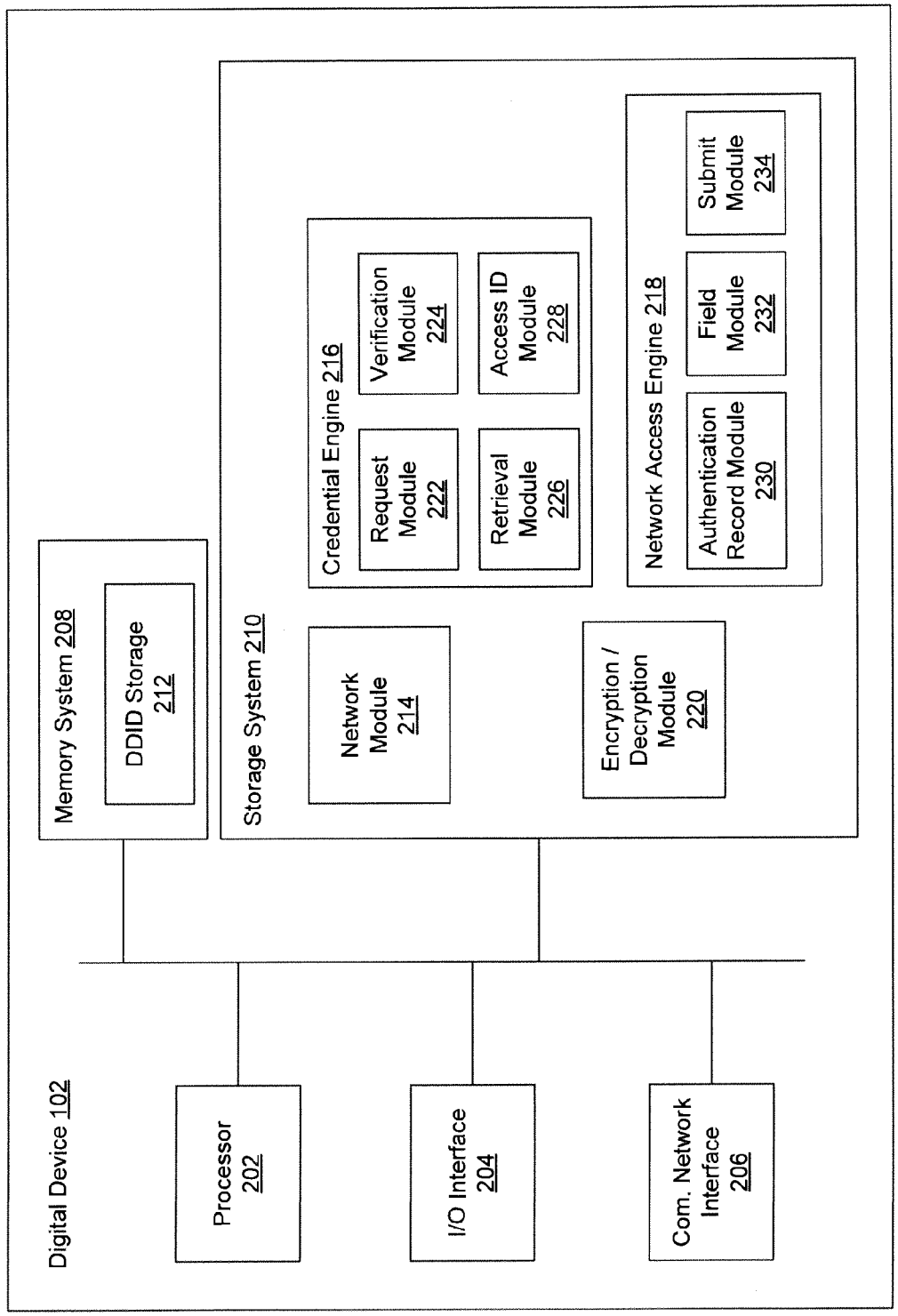
FIG. 2 is a block diagram of an exemplary digital device.

Referring now to FIG. 2, the exemplary digital device 102 is shown in more detail. In exemplary embodiments, the digital device 102 comprises a processor 202, input/output (I/O) interface(s) 204, a communication network interface 206, a memory system 208, and a storage system 210. The I/O interfaces 204 may comprise interfaces for various I/O devices such as, for example, a keyboard, mouse, and display device. The exemplary communication network interface 206 is configured to allow the digital device 102 to allow communications with the communication network 114 and/or the local area network 106. The storage system 210 may comprise various databases or storage, such as, for example, a DDID storage 212 which stored a digital device identifier for the digital device 102.

The storage system 210 comprises a plurality of modules utilized by embodiments of the present invention to access the hotspot. In one embodiment, the storage system 210 comprises a network module 214, a credential engine 216, a network access engine 218, and an encryption/decryption module 220. Alternative embodiments of the digital device 102 and/or the memory system 208 may comprise more, less, or functionally equivalent components and modules.

The network module 214 may be configured to perform operations in order to access the local area network 106. In some embodiments, the network module 214 may receive and transmit communications associated with accessing the hotspot. The network module 214 may also perform a search for the communication network 114. For example, if the network module 214 determines that there is no access to the communication network 114, embodiments of the present invention herein may be practiced.

The exemplary credential engine 216 is configured to obtain the network credential. In exemplary embodiments, the credential engine 216 may comprise a request module 222, a verification module 224, a retrieval module 226, and an access ID module 228. The exemplary request module 222 is configured to generate a credential request for the network credential. The credential engine 216 may also receive a credential request response (via the network module 214) and verify, via the verification module 224, that the credential request response is from the credential server 116. The exemplary retrieval module 226 is configured to analyze the credential request response to obtain the network credentials. The process for obtaining the network credential will be discussed in more details in connection with FIG. 4 below.

The exemplary access ID module 228 is configured to receive network information from the network (e.g., a wired or wireless network) and/or the network device 104 and generate an access identifier based on the network information. In one example, the digital device 102 may scan for a wireless network. The network device 104 may provide network information regarding the network. The network information may comprise information that identifies the network and/or requests information for access. In some examples, the network information may comprise information regarding how to access the network, an SSID, a name of the network, a name of the network device 104, an IP address, a web page (e.g., a captive portal redirection page), or the like.

For example, the access ID module 228 may retrieve an SSID from the network information and generate an access identifier based on the SSID. In one example, the access identifier comprises the SSID. In another example, the access identifier comprises an encoded SSID. The access identifier may be incorporated within the credential request. The credential server 116 may identify the correct network credentials based, at least in part, on the access identifier.

The access ID module 228 may generate an access identifier from many different types of network information. In some networks, an SSID is not available (e.g., due to the lack of a suitable application programming interface (API) or when using a wired network interface). If the SSID is not available, the access ID module 228 may generate an access identifier based on an IP address within the network information, a URL, a location, a title of a captive redirect portal page, or a combination of any of the above. In one example, the access ID module 228 may generate an access identifier based on a domain of a URL of the captive redirect portal page.

The access ID module 228 may also combine different types of information from the network information. For example, the access ID module 228 may combine a URL from the captive redirect portal page and a name from the page to create a single access identifier. In another example, the access ID module 228 may combine a URL and location information from XML data of the network information to generate the access identifier. Those skilled in the art will appreciate that the information may be formatted in many ways to condense the access identifier (e.g., combine the URL and title while removing spaces and special characters) or expand the access identifier (e.g., adding deliminators). In some embodiments, the access identifier may be formatted to comply with external protocol restrictions (e.g., character set and length limitations for DNS domain names). Those skilled in the art will also appreciate that the access ID module 228 may be configured to generate multiple access identifiers. All or some of the access identifier may be encoded. In one example, the access identifier is hex encoded.

The exemplary network access engine 218 is configured to receive an authentication request and provide an authentication response to the network device 104 comprising the network credential. The network access engine 218 may comprise an authentication record module 230, a field module 232, and a submit module 234. The exemplary authentication record module 230 is configured to identify an authentication record associated with the digital device 102. The field module 232 identifies fields or elements in the authentication record and provides the proper element inputs (e.g., network credential) in the fields. The submit module 234 is configured to automatically submit the authentication record to the network device 104 as the authentication response. The process for providing the authentication response is discussed in more details in connection with FIG. 5 below.

The encryption/decryption module 220 is configured to encrypt or decrypt communications sent/received by the digital device 102. In some embodiments, the credential request response may be encrypted by the credential server 116. In these embodiments, the encryption/decryption module 220 will decrypt the credential request response. In some embodiments, the encryption/decryption module 208 may establish a secure communication via SSL and/or https between the digital device 102 and the authentication server 108. It should be noted that, in accordance with some embodiments, the encryption/decryption module 220 may be optional or not required.

Figure 3:
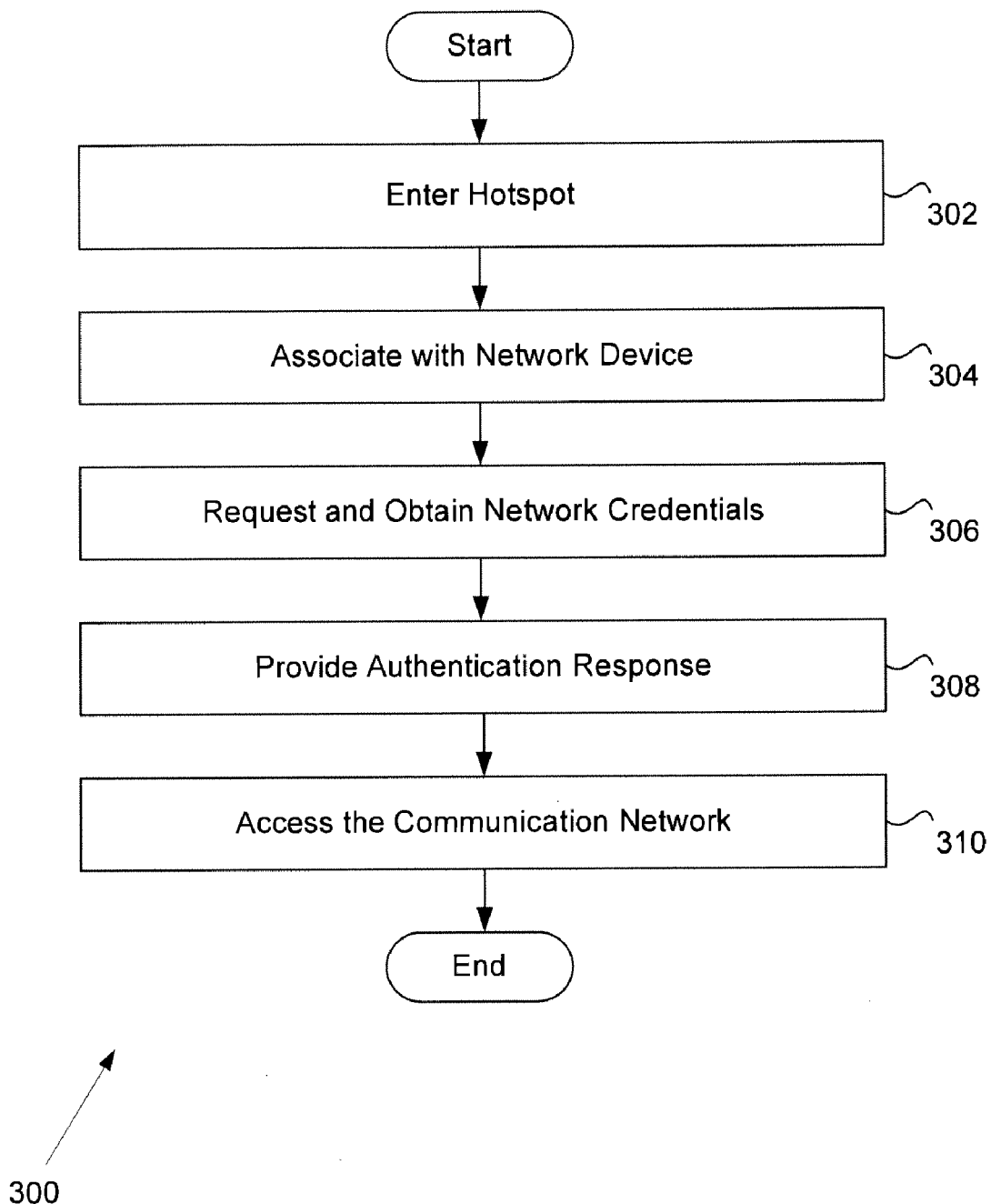
FIG. 3 is a flowchart of an exemplary method for providing network access to the digital device.

Referring now to FIG. 3, a flowchart 300 of an exemplary method for providing communication network access to the digital device 102 is shown. In step 302, the digital device 102 enters a hotspot. For example, a user may turn on their digital device 102 in a coffee shop or hotel where communication network access (e.g., hotspot) is available. Once the activated digital device 102 enters the hotspot, the digital device 102 may sense the hotspot. For example, the network module 214 may automatically attempt to access the communication network 114.

Once operational within the hotspot, the network module 214 of the digital device 102 may query the network device 104 of the hotspot in step 304. In exemplary embodiments, the network device 104 comprises the access point for the hotspot. By querying the network device 104, the network module 214 may receive one or more IP addresses associated with a central server (e.g., the DNS server 110) which may be associated with a service provider. Other information may also be received such as DNS records and gateway records. In exemplary embodiments, the IP addresses may be provided via DHCP. In one embodiment, the network module 214 may attempt to access a known server to determine whether there is live connection to the communication network 114.

In step 306, the digital device 102 requests and obtains the network credential from the DNS server 110. The process of step 306 will be discussed in more details in connection with FIG. 4 below.

Once the digital device 102 obtains the network credential, the digital device 102 may provide an authentication response to the network device 104 in order to access the communication network 114 via the network device 104 in step 308. The process of step 308 will be discussed in more details in connection with FIG. 5 below.

The network device 104 will then attempt to authenticate the digital device 102 by comparing the network credential received in the authentication response. According to one embodiment, the network device 104 may authenticate the network credential utilizing the authentication server 108. For example, the network credential may be compared against a database of network credentials stored or associated with the authentication server 108.

If the network credentials are authenticated, the digital device 102 will be granted access to the communication network in step 310. In one embodiment, the authentication server 108 may instruct the access controller 112 to allow the digital device 102 access to the communication network 114.

Figure 4:
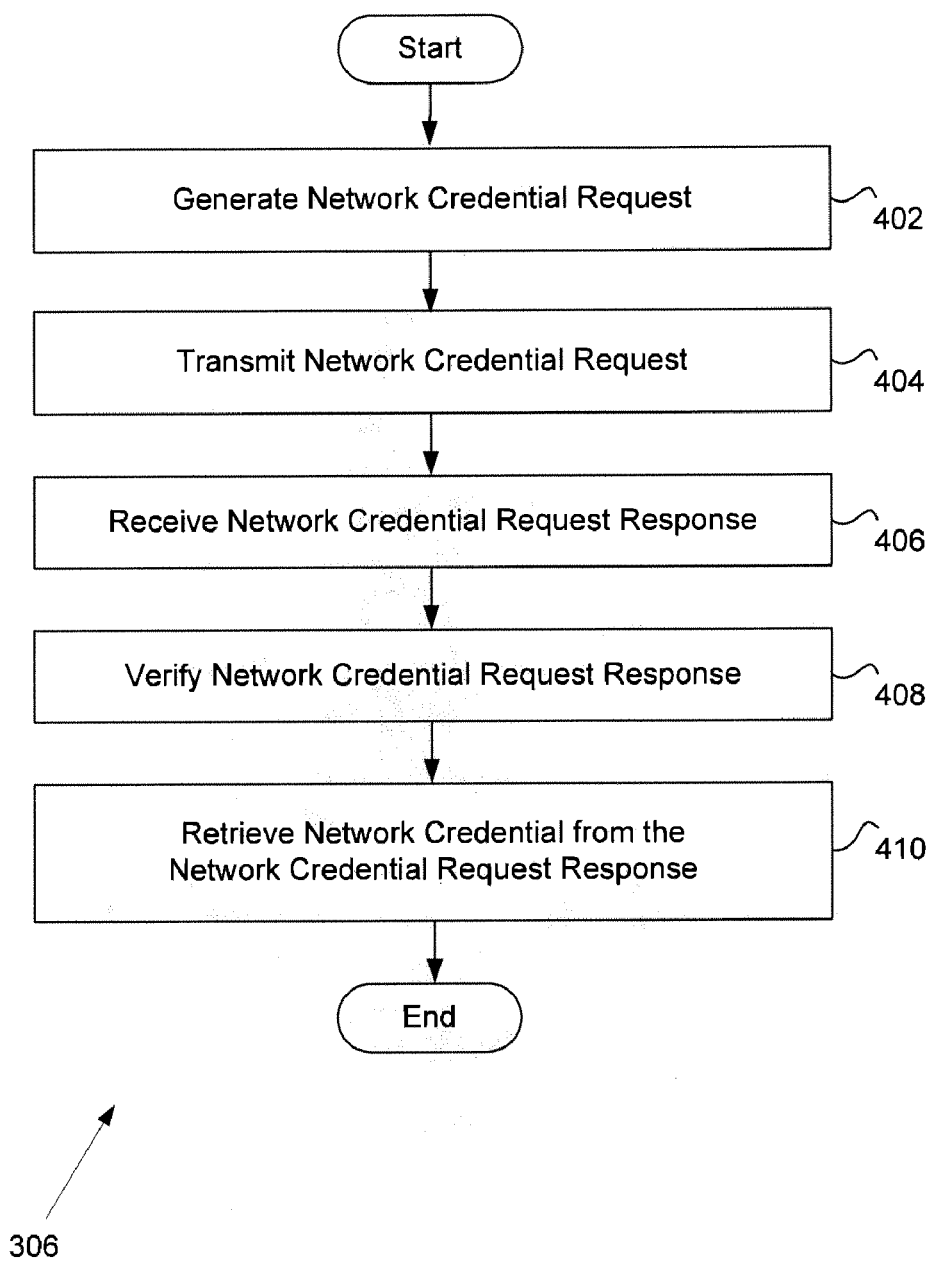
FIG. 4 is a flowchart of an exemplary method for obtaining network credentials.

Referring now to FIG. 4, a flowchart of an exemplary method for obtaining the network credential (step 306) is shown. In step 402, the network credential request is generated. In accordance with one embodiment, the request module 222 may construct a string using a DNS structure that may already be on a platform of the digital device 102. The exemplary DNS string generated by the request module 222 is discussed in more details in connection with FIG. 8 below.

In step 404, the generated credential request is sent by the digital device 102. In exemplary embodiments, the digital device 102 utilizes one of the IP addresses (of the DNS server 110) received from the network device 104. The DNS string is then transmitted to the selected DNS IP address received by the network module 214.

In step 406, the digital device 102 receives the credential request response. In exemplary embodiments, the credential request response is received from the credential server 116 via the DNS server 110. The credential request response may be encrypted. In these embodiments, the encryption/decryption module 220 will decrypt the credential request response.

The credential request response is then verified in step 408. In exemplary embodiments, the credential request response is encrypted. The digital device 102 (e.g., the verification module 224) may decrypt the credential request response. In some embodiments, the credential request response is digitally signed. The digital device 102 (e.g., the verification module 224) may verify the authenticity of the credential request response by decrypting the digital signature or decrypting the credential request response. In alternative embodiments, other mechanisms may be used by the verification module 224 to authenticate the credential request response.

The network credentials may then be retrieved in step 410. In exemplary embodiments, the retrieval module 226 will analyze the credential request response to obtain the network credentials embedded therein. In one example, the retrieval module 226 identifies data within the retrieval module 226 (e.g., via delimited fields) and may retrieve an encryption key, a user name, a password, a form identifier, or the like.

Figure 5:
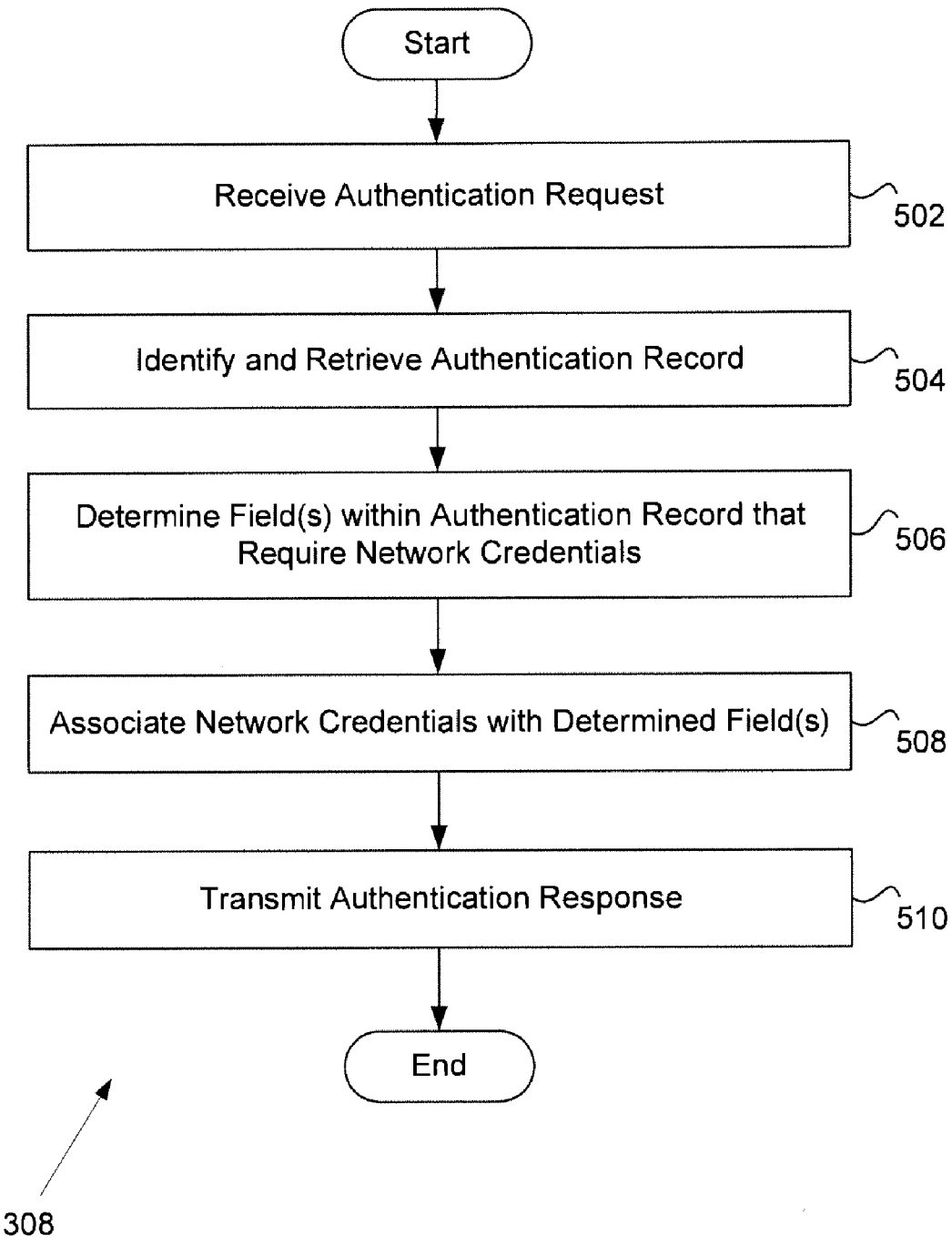
FIG. 5 is a flowchart of an exemplary method for authenticating the digital device with the network device.

Referring now to FIG. 5, a flowchart of an exemplary method for authenticating the digital device 102 (e.g., providing an authentication response of step 308) with the network device 104 is shown. In step 502, an authentication request is received from the network device 104 by the network module 214.

The authentication record module 230 then identifies and retrieves an authentication record in step 504. In exemplary embodiments, the authentication request from the network device 104 may comprise HTML form element names associated with an authentication record in which the network credential may be provided. The authentication record module 230 may parse out the form(s)/authentication record(s) needed for logging in with the network device 104, for example, via the name or identifier (e.g., login form).

In step 506, the field module 232 determines field(s) or elements(s) within the authentication record that require an authentication input (e.g., network credential). According to exemplary embodiments, the field module 232 will analyze the authentication records identified and retrieved in step 504 to find input fields. As such, a list of these input fields may be generated (e.g., a linked list of forms and input fields).

In step 508, network credentials are associated with the determined fields) or element(s). In exemplary embodiments, the field module 232 will associate a proper network credential with each input element. The association may be based on an input name or identifier found in the script of the HTML of the authentication request. For example, the authentication record may comprise an input element requesting a username or an e-mail address.

An authentication response comprising the authentication record is transmitted in step 510. According to one embodiment, once the network credential(s) have been associated with the authentication record by the field module 232, a post is generated. In some embodiments, the authentication record may comprise a plurality of hidden values used to identify the digital device 102 and session information in addition to network access credentials. Such information and values may include, for example, network device MAC address, session identifier, and other values which may be stored in hidden form elements.

It should be noted that in some embodiments, the authentication request may not be the first webpage presented by the network device 104. For example, if a user is attempting to sign on at a coffee shop, the first webpage may be a welcome webpage from the coffee shop. This welcome webpage may provide a plurality of login options. In these embodiments, a unique fragment of a URL associated with the authentication request may be embedded on the first webpage. As a result, the digital device 102 (e.g., the network module 214) may skim through the webpage to find the fragment. Once the fragment is found, the digital device 102 will perform a get on this subsequent webpage (e.g., authentication request).

Figure 6:
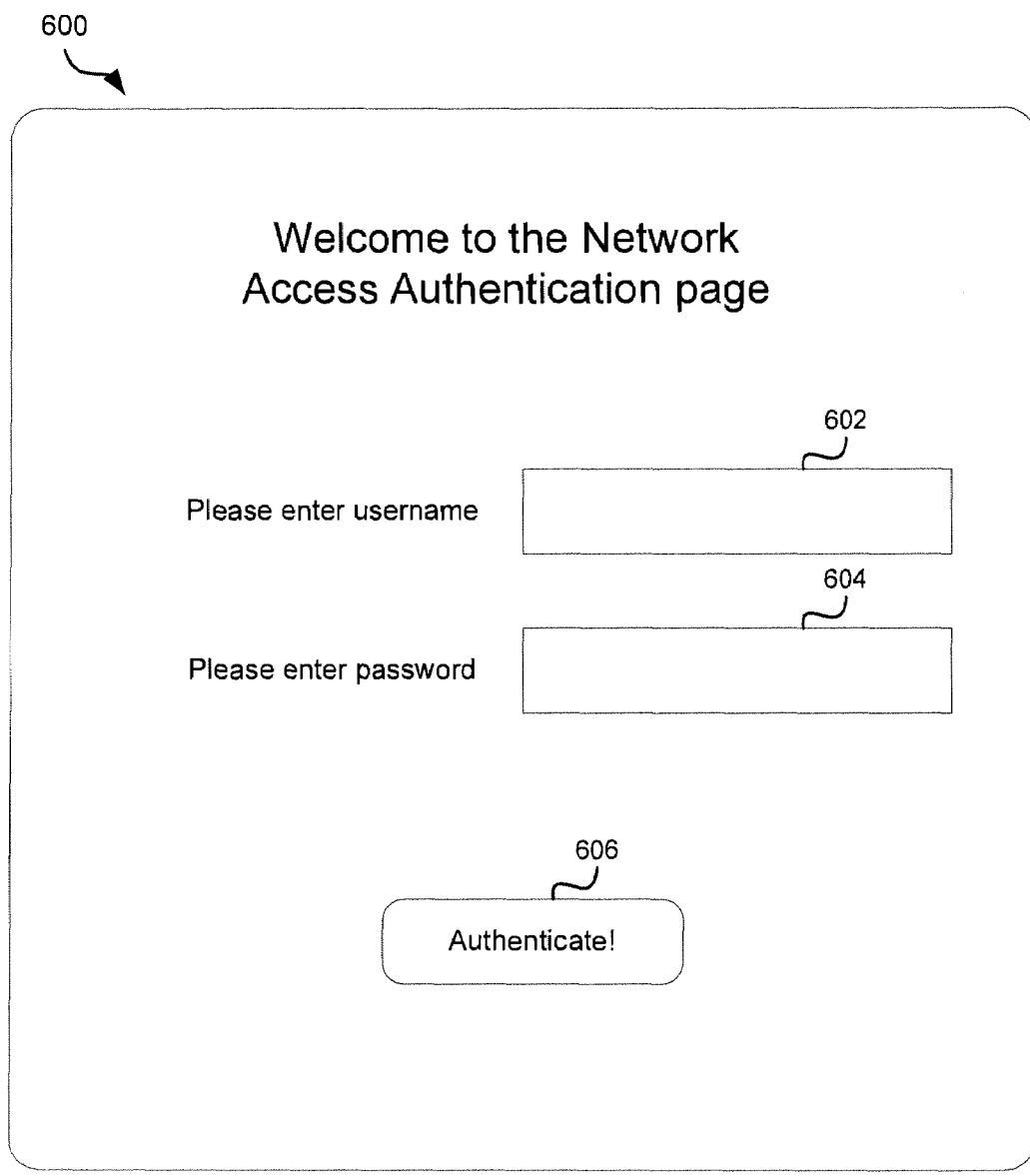
FIG. 6 is a display of an exemplary network access authentication page, according to one embodiment of the present invention.

Referring now to FIG. 6, an exemplary authentication page 600 (e.g., authentication record) is shown. The authentication page 600 may comprise a username field 602 and a password field 604. In some embodiments, the username field 602 may be replaced with an e-mail field or any other field for providing a unique identifier associated with the digital device 102 or associated user. According to exemplary embodiments of the present invention, the field module 232 may automatically fill in the username field 602 and password field 604 with the network credentials.

The authentication page 600 may also comprise an authenticate selector 606 (e.g., a submit selector or button). The authenticate selector 606 will submit the network credentials (e.g., user name and password) to the network device 104. In some embodiments, the submit module 234 may automatically activate the authenticate selector 606 once the network credentials have been associated with their respective fields 602 and 604.

Figure 7:
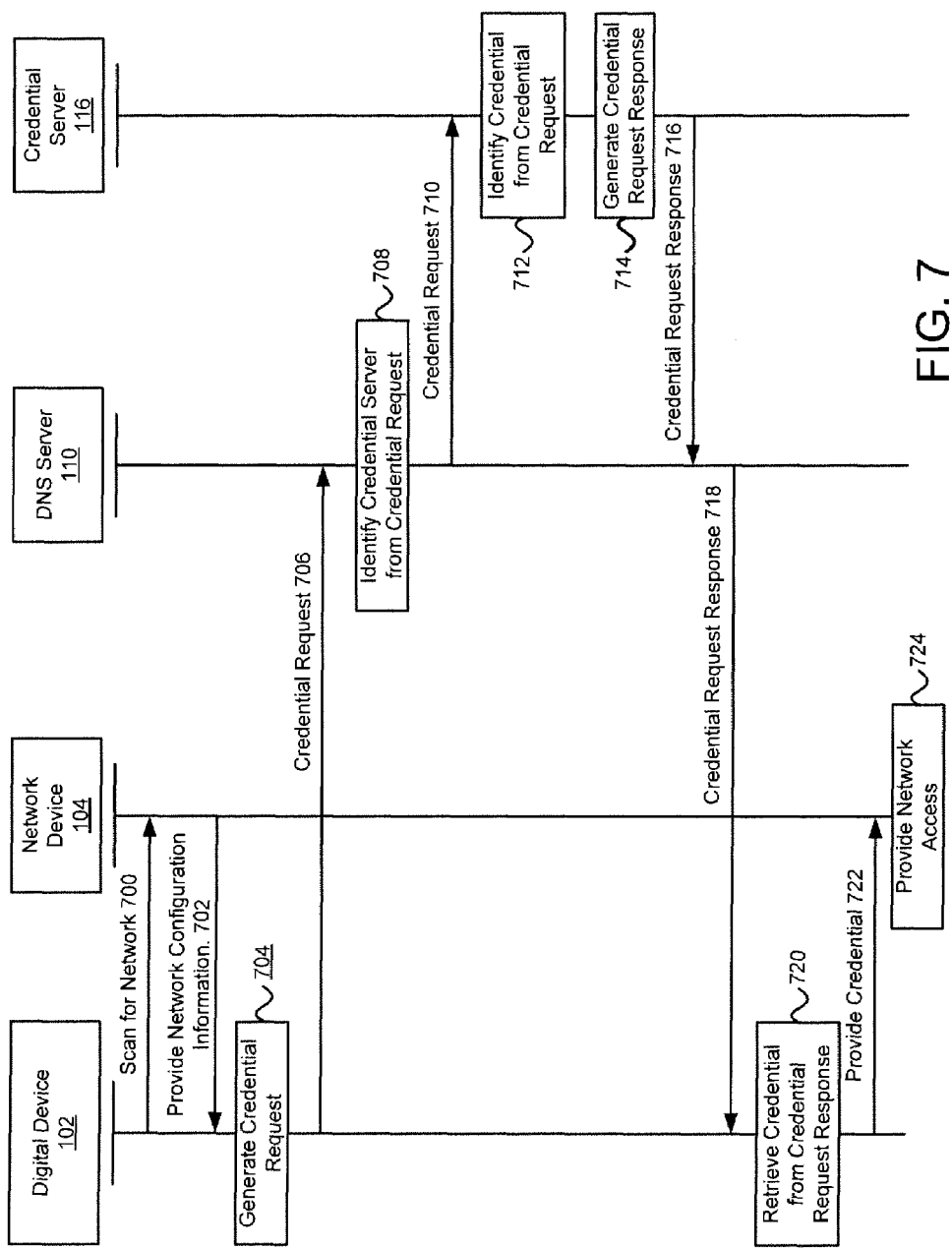
FIG. 7 is a flow diagram of an exemplary process for providing network access to the digital device.

FIG. 7 illustrates a flow diagram of an exemplary process for providing network access to the digital device 102. When the digital device 102 first enters into a hotspot, the digital device 102 (e.g., network module 214) may scan for the communication network 114 in step 700. As a result of the scan, the network device 104 may provide network configuration information in step 702. The network configuration information may comprise one or more IP address for access to the DNS server 110.

In step 704, a credential request is generated by the digital device 102. As discussed above in connection with FIG. 4, the request module 222 may generate the credential request. Subsequently, the credential request is sent to the DNS server 110 in step 706 using one of the IP addresses previously received from the network device 104.

Based on the credential request, the credential server 116 is identified by the DNS server 110 in step 708.

The credential server 116 then identifies the network credential needed based on the credential request in step 712. For example, the credential request may comprise a unique identifier for the digital device 102. This unique identifier along with the location identifier may be compared against a table of such identifiers at the credential server 116 to determine the proper network credential. A credential request response is then generated in step 714 and sent back to the DNS server 110 in step 716. The DNS server 110 forwards the credential request response back to the digital device in step 718.

The digital device 102 may then retrieve the network credentials from the credential request response in step 720. In exemplary embodiments, the retrieval module 226 will analyze the credential request response to retrieve the network credential embedded therein.

The network credential may then be provided to the network device 104 in step 722. An exemplary method for providing the network credentials to the network device 104 is discussed in connection with FIG. 5 above. Upon verifying the network credentials, the network device 104 provides network access to the digital device 102 in step 724.

Referring now to FIG. 8, an exemplary credential request 800 is shown in more details. According to exemplary embodiments, the request module 222 may generate the credential request 800. In one embodiment, the credential request 800 may be a DNS string having a structure that comprise a location identifier 802, a sequence identifier 804, a signature 806, a digital device identifier (DDID) 808, an access identifier 810, and a version identifier 812.

The optional location identifier 802 may indicate a physical or geographic location of the digital device 102, the network device 104, the authentication server 108, or the access controller 112. In various embodiments, the location identifier 802 may be used by the credential server 116 to track the usage of hotspots, users of the digital device 102, as well as the digital device 102.

The sequence identifier 804 may comprise any number or set of numbers used to correspond to a subsequent request to the credential server 116 to determine if the login is successful. That is, the sequence identifier 804 provides a correlation mechanism by which verification of the login process may be made by the credential server 116.

In exemplary embodiments, the signature 806 comprises a cryptographic signature that is utilized to prevent spoofing. The signature 806 of the request from digital device 102 is verified by the credential server 116. If the signature 806 is not valid, then the request is rejected by the credential server 116.

The DDID 808 comprises a unique identifier of the digital device 102. For example, the DDID 808 may comprise a MAC address or any other universally unique identifier of the digital device 102. In exemplary embodiments, the DDID is retrieved from the DDID storage 212.

The access identifier 810 comprises an identifier of the network access point or Wi-Fi service provider. For example, the access identifier 810 may comprise an SSID or other information as discussed herein. Further, in some embodiments, the access identifier 810 may comprise the name of the service provider, or the name of the venue operating the network device 104. The version identifier 812 may identify the protocol or format of the credential request 800. For example, a digital device may generate the credential request 800 and organize the data in a number of different formats. Each different format may be associated with a different version identifier. In some embodiments, the components of the credential engine 216 and the network access engine 218 may be updated, reconfigured, or altered over time, which may affect the structure of the credential request 800. As a result, the credential server 116 may receive a plurality of credential requests 800 which are formatted differently. The credential server 116 may access the required information from each credential request based on the respective version identifier.

Figure 9:
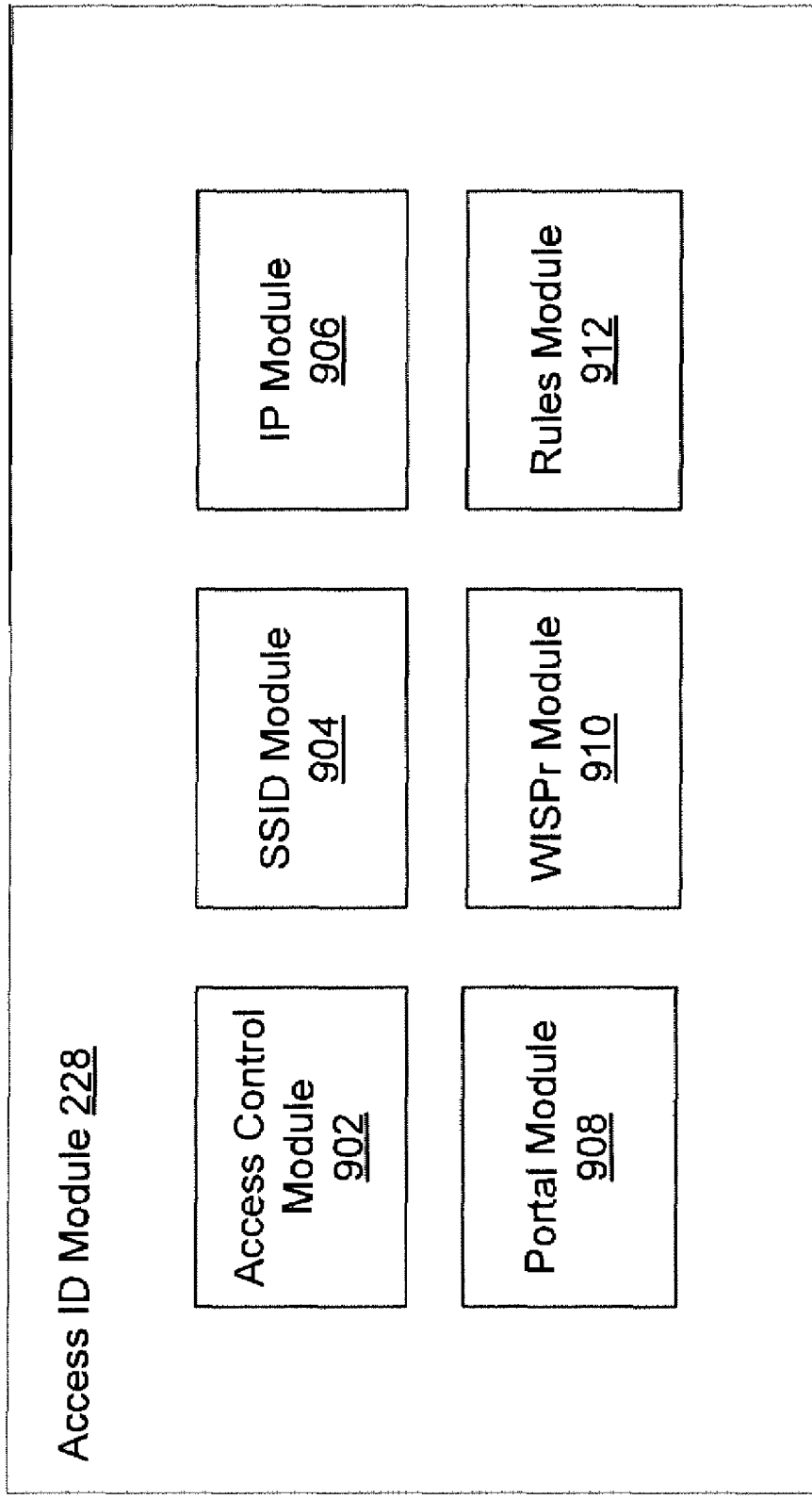
FIG. 9 is a block diagram of an exemplary access ID module.

FIG. 9 is a block diagram of an exemplary access ID module 228. The access ID module 228 comprises an access control module 902, an SSID module 904, an IP module 906, a portal module 908, a WISPr Module 910, and a rules module 912. The access control module 902 controls the access ID module 228. In various embodiments, the access control module 902 generates the access identifier and forwards the access identifier to the request module 222 (FIG. 2). The request module 222 may then generate the credential request based, at least in part, on the access identifier. The credential server 116 may identify and provide network credentials to the digital device 102 based on the access identifier. The digital device 102 may then use the network credentials to access a network.

In some embodiments, the access control module 902 is configured to generate an access identifier based on access information, received from one or more other modules of the access ID module 228. In some embodiments, the access control module 902 is configured to format the access identifier so that the access identifier may be embedded in a DNS request.

The SSID module 904 is configured to identify an SSID in network information associated with a network, and, if present, pass the SSID to the access control module 902. In various embodiments, the digital device 102 scans for a network (e.g., wireless or wired). The digital device 102 may receive or retrieve network information (e.g., information associated with the network, network device 104, or a business associated with the network or network device 104) associated with at least one network. The SSID module 904 may then identify an SSID from the network information and pass the SSID to the access control module 902 which may then generate an access identifier based on the SSID. In one example, the access identifier is the SSID. In another example, the access identifier may comprise any information including the SSID.

The IP module 906 is configured to identify an IP address in the network information. In some examples, the network information comprises an IP address associated with a network and/or an IP address associated with a DNS resolver. In some embodiments, when the IP module 906 identifies an IP address in the network information, the IP module 906 determines if the IP address is from a private non-routable address block. If the IP address is from a private non-routable address block, the access identifier may not comprise or be based on the IP address since many networks may use the same address ranges.

In some embodiments, the IP module 906 identifies an IP address associated with a DNS resolver. The DNS resolver may be set to an IP address in a local network in order to allow an access controller to restrict internet access to port 53. In one example, the IP module 906 identifies an IP address in the network information and determines that the IP address is not from a private non-routable address block (e.g., by comparing the IP address to commonly used ranges from private non-routable address blocks). The IP module 906 may then provide the IP address to the access control module 902 which may generate the access identifier based on (or including) the IP address.

The portal module 908 is configured to identify useful information from a captive portal redirection page received from the network device 104. In some embodiments, captive portal implementations will respond to an initial HTTP GET operation by sending back to the digital device 102 a temporary redirection result code and/or include a location header in an HTTP header that contains a URL for the browser to access. In various embodiments, the captive portal redirection page may comprise WISPr data.

For cases where the initial redirect does not contain WISPr XML data (either because the network is not using WISPr, or because the XML data is embedded in the main login HTML rather than being attached to the redirect reply), the portal module 908 may be configured to identify the domain portion of the redirection target and/or an HTML title text of the page that is being directed to.

For example, the captive portal redirection page may comprise a URL for the domain wireless.nnu.com (e.g., the domain of the page that the captive portal redirection page is redirecting to). The captive portal redirection page may also comprise a title (e.g., the title of the page that is being redirected to) such as "Welcome to Tully's Coffee." The portal module 908 may retrieve and send the domain and title to the access control module 902 which may then generate an access identifier based on the domain and title. In one example, the access control module 902 generates "wireless-nuucomWelcometoTullysCo" as an access identifier. The credential server 116 may ultimately receive a credential request and determine the appropriate network credential based on the access identifier.

Those skilled in the art will appreciate that the credential server 116 may identify a network credential based on the access identifier in any number of ways. In some embodiments, the credential server 116 may identify a network credential for a specific network and/or a specific network device 104 (e.g., wireless access point) based on the access identifier. In other embodiments, the credential server 116 may identify a network credential for a variety of networks and/or variety of network devices based on the access identifier. For example, all Tully's Coffee Shops may share a similar captive portal redirection page with a similar URL and a similar title for a single user or for multiple users. Further, Tully's Coffee Shops may be configured to accept the network credential for network access for one or more users. When the credential server 116 receives the access identifier "wirelessnuucom-WelcometoTullysCo," the credential server 116 may retrieve the network credentials for Tully's Coffee Shop and provide the network credential in a credential request response to the digital device 102 which may then provide the network credential to the network device 104.

The WISPr module 910 is configured to identify XML data received from the network device 104. In one example, the network associated with the network device 104 is associated with a WISPr network. The network device 104 may provide the XML data attached to the captive portal redirection page. The XML data may contain sufficient information to create an access identifier. In some embodiments, the XML data may contain a URL to send the network credentials to and the name of the location. The location, for example, may be the title of a page, the name of a digital device, or the name of a business associated with the network and/or the network device 104.

In one example, the domain name from a login URL of the XML data provides a usable string for the access identifier. The WISPr module 910 may identify the URL from the XML data, remove formatting, and provide the resulting string to the access control module 902 which may generate the access identifier.

Those skilled in the art will appreciate that the URL may be insufficient because some networks use third party authentication services such as Aptilo who use the same login URL for all partners. In some embodiments, the WISPr module 910 may identify a URL and a name of a location in the XML data. The WISPr module 910 may concatenate the location name to the login URL domain, strip punctuation and white space, and/or, optionally, truncate to 31 characters. Alternately, different elements of an access identifier (e.g., URL and location of XML data or URL and title of a captive portal redirection page) may be encoded as separate elements. For example, the access identifier may comprise "wirelessnnucom.welcometoullyscoffee.a0.dsadns.net." In some embodiments, the access control module 902 is configured to not strip white space or punctuation when generating the access identifier. The access control module 902 may or may not hex encode the generated access identifier. In other embodiments, the location and/or login URL domain are not reformatted or altered at all. The result may then be provided to the access control module 902.

The following is exemplary XML data (from a Wayport location) that may be identified by the WISPr module 910:

The WISPr module 910 may identify the domain as "secure.wayport.net" from the URL and the location name as "Devicescape Headquarters." The WISPr module 910 may concatenate the location name to the login URL domain, strip punctuation and white space, and, optionally, truncate to 31 characters to produce "securewayportnetDevicescapeHead" which may be the access identifier used by the access control module 902.

In some embodiments, the credential server 116 may receive the credential request from the digital device 102 and retrieve one or more network credentials based on the access identifier "securewayportnetDevicescapeHead." The credential server 116 or the access control module 902 may change the access identifier if the location is not needed to "securewayportnet%" where % is a wildcard. Those skilled in the art will appreciate that any symbol may be used in place of the % symbol. Further, those skilled in the art will appreciate that there may be no symbol in the access identifier (e.g., the access identifier is "securewayportnet").

In another example, the following exemplary XML data that may be identified by the WISPr module 910 is received:

| Kubi Domain: | apc.aptilo.com |
|---|---|
| Location Name: | KubiWireless,Aena_-_Madrid_-_Barajas |

The WISPr module 910 may identify the domain as "apc.aptilo.com" from the URL and the location name as "KubiWireless,Aena_-_Madrid_-_Barajas." The WISPr module 910 may concatenate the location name to the login URL domain, strip punctuation and white space, and, optionally, truncate to 31 characters to produce "apcaptilocomKubiWirelessAenaMad" which may be the access identifier used by the access control module 902. The credential server 116 or the access control module 902 may change the access identifier if the location is not needed to "apcaptilocomKubiWireless %" where the concatenated string "AenaMad" is not used. Those skilled in the art will appreciate that any amount of the URL name, location, or any other part of the XML data and/or redirection page may be used to generate an access identifier.

The rules module 912 may configure the access control module 902 to generate the access identifier in any number of ways. In one example, the rules module 912 may configure the access control module 902 to determine if an SSID associated with a network is available. If the SSID is available, the access control module 902 may base the access identifier on the SSID.

The rules module 912 may also configure the access control module 902 to determine if a useable IP address is available (e.g., determine if an IP address is available and, if so, determine if the IP address is not part of a private non-routable

```
<WISPAccessGatewayParam
    xmlns:xsi="http://www.w3.org/2001/XMLSchema-instance"
    xsi:noNamespaceSchemaLocation=
    "http://secure.wayport.net/WayportGISParam.xsd">
    <Redirect>
        <AccessProcedure>1.0</AccessProcedure>
        <AccessLocation>wp_18738.101333</AccessLocation>
        <LocationName>Devicescape Headquarters</LocationName>
        <LoginURL>https://secure.wayport.net/roamer_login.adp</LoginURL>
        <MessageType>100</MessageType>
        <ResponseCode>0</ResponseCode>
    </Redirect>
</WISPAccessGatewayParam>
``` address block) if the SSID is not available. If a useable IP address is available, the access control module may base the access identifier on the useable IP address.

If neither the SSID nor the IP address is available, the rules module 912 may configure the access control module 902 to determine if XML data is present and, if so, determine if a URL and/or a name of a location is present in the XML. If present, the access control module 902 may base the access identifier on the URL and/or the location.

If the SSID, IP address, and XML data are not present, then the access control module 902 may be configured to generate an access identifier based on a URL and/or a title of a captive portal redirection page.

In various embodiments, the rules module 912 may configured the access control module 902 to perform one, some, or all of these actions in a variety of orders. In some embodiments, a user of the digital device 102 and/or the credential server 116 may configure to the rules module 912 to configure the access control module 902 to generate the access identifier in any number of ways and/or attempt to generate the access identifier in any order of operations.

In some embodiments, the access ID module 228, when generating the access identifier, encodes data received from the SSID module 904, IP module 906, portal module 908, and/or WISPr module 910. In one example, the access ID module 228 hex encodes information to be used as an access identifier. The hex code of the access point may be limited to a set of characters (such as 31 characters) due to the protocol used to communicate with the credential server 116. Those skilled in the art will appreciate that the access ID module 228 may encode the information to be used as an access identifier in any number of ways. In some embodiments, the information to be used as an access identifier is not encoded (e.g., the access identifier is not hex encoded and may include up to 63 alphanumeric characters).

Figure 10:
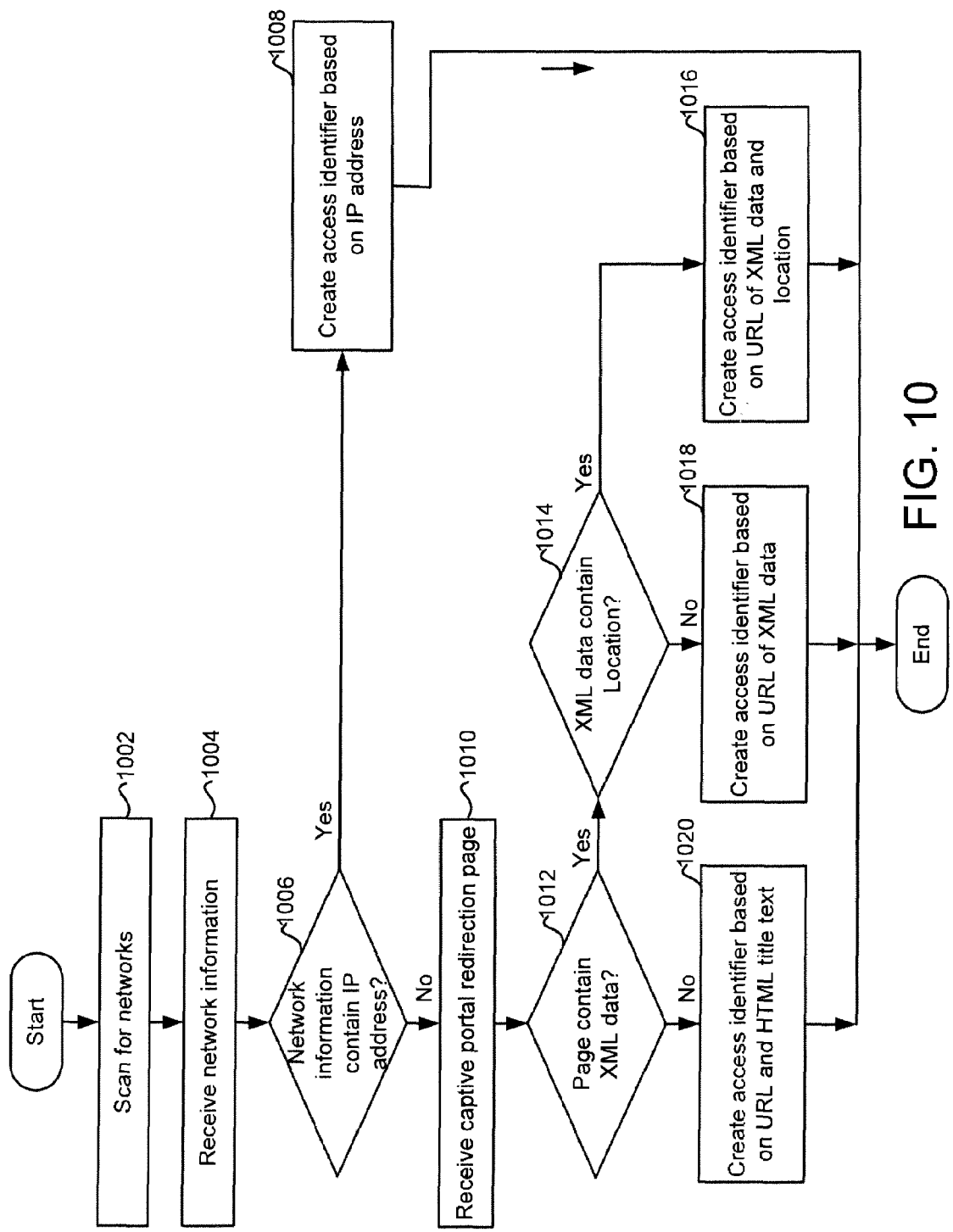
FIG. 10 is a flow diagram of an exemplary process for identifying and accessing a wireless network.

FIG. 10 is a flow diagram of an exemplary process for identifying and accessing a wireless network. In various embodiments, the rules module 912 configures the access ID module 228 to search for different information that may be used as an access identifier. The rules module 912 may prioritize the search for different information, starting with the search for the most preferable information and, if that information is unavailable, then to search for the next most preferable information, and so forth. In various embodiments, the rules module 912 may configure the access ID module 228 to first search for the SSID associated with a network, then search for an IP address if the SSID is unavailable, then search for WISPr XML data if the SSID and the IP address are unavailable, and so forth.

Those skilled in the art will appreciate that the access ID module 228 may receive messages from the digital device 102 and/or the credential server 116 indicating that a different access identifier is required. In one example, the access ID module 228 may be configured to provide an access identifier comprising an IP address associated with a network. The credential server 116, however, may not be able to identify any network credentials associated with the access ID module 228. As a result, the access ID module 228 may receive an access identifier request from the credential server 116 for a different access identifier. The access ID module 228 may then search for other information to generate a new access identifier (e.g., based on a URL and location in an XML data block). The access ID module 228 may continue to negotiate with the credential server 116 until an access identifier related to network credentials is found or until the access ID module 228 runs out of information that may be used as an access identifier.

In some embodiments, the credential server 116 may request a specific access identifier (e.g., a URL and title associated with a captive portal redirection page). In one example, the credential server 116 may recognize some of the information from the access identifier sufficient to identify the type of information that is required to identify the correct network credential. The credential server 116 may provide a request for the needed access identifier to the access ID module 228.

In other embodiments, based on the provided access identifier, the credential server 116 may identify a set (e.g., a plurality) of possible network credentials. The credential server 116 may provide the set of possible network credentials to the digital device 102 as a part of a credential request response. The access ID module 228 may generate a different access identifier that will allow the credential engine 216 to identify one or more correct network credentials from the set of network credentials. The identified correct network credentials may then be provided to the network device 104 for network access. Those skilled in the art will appreciate that the correct network credentials may be identified in any number of ways.

In step 1002, the network module 214 scans for and selects an active network. In one example, the network module 214 scans an area for a wireless network. In another example, the network module 214 detects a wired network, such as an Ethernet wire.

In step 1004, the digital device 102 receives network information. The network information may comprise an SSID, IP address, a captive portal redirection page, and/or XML data. If the network information comprises an SSID, the access ID module 228 may generate an access identifier based on the SSID and the method depicted in FIG. 10 may end.

In step 1006, the IP module 906 determines if the network information contains an IP address. If the network information contains an IP address, the IP module 906 may determine if the IP address is public or otherwise useable (e.g., the IP address may be used to send information by a digital device on the Internet). If the IP address is useable and not part of a private non-routable address, the IP module 906 may direct the access control module 902 to generate an access identifier based on the IP address (e.g., removing the punctuation and/or concatenating or adding one or more characters) in step 1008. The method depicted in FIG. 10 may end after step 1008.

In step 1010, the digital device 102 may receive a captive portal redirection page. In one example, the captive portal redirection page is received from the network device 104. In some embodiments, the access information may comprise the portal redirection page and/or XML data. In various embodiments, the access ID module 228 may review pages from the network device 104 to determine if a login form and title are reached. In one example, the access ID module 228 may scan a page received from the network device 104 to determine if the page is blank. If the page is blank or does not contain a login form, the access ID module 228 may trigger new pages from the digital device 102 (e.g., by activating a button or other control on a web page to reach the login page). Once the login page is reached, the method may continue.

In step 1012, the WISPr module 910 determines if the captive portal redirection page contains WISPr XML data. If the captive portal redirection page contains WISPr XML data, the WISPr module 910 determines if the WISPr XML data contains a location. If the captive portal redirection page contains or is associated with WISPr XML data and the WISPr XML data comprises a location, the access control module 902 or the WISPr module 910 may combine a domain within a URL of the WISPr XML data with the location to create an access identifier in step 1016.

If the captive portal redirection page contains or is associated with WISPr XML data and the WISPr XML data does not comprise a location, the access control module 902 or the WISPr module 910 may generate an access identifier based on a URL of the WISPr XML data (e.g., based on a domain of the URL) in step 1018.

If the captive portal redirection page does not contain and is not associated with WISPr XML data, the access control module 902 or the portal module 908 may create an access identifier based on a URL within the page and/or HTML title text in step 1020. In various embodiments, the portal module 908 may use any elements or combination of elements from the captive portal redirection page (not just the URL and title) to generate the access identifier. In one example, the portal module 908 may be configured to take a URL from a first form instead of the redirection page. Further, the portal module 908 may use the some or all information from anywhere in the captive portal redirection page (e.g., the first paragraph) to generate the access identifier, not just the title. In various embodiments, various web pages received from or via the network device 104 may be searched and information extracted to create an access identifier to provide to the credential server 116. Those skilled in the art will appreciate that, in various embodiments, an access identifier may comprise any type of XML (i.e., not only WISPr XML data) or HTML data.

The above-described functions and components can be comprised of instructions that are stored on a storage medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with embodiments of the present invention. Those skilled in the art are familiar with instructions, processor(s), and storage medium.

The present invention has been described above with reference to exemplary embodiments. It will be apparent to those skilled in the art that various modifications may be made and other embodiments can be used without departing from the broader scope of the invention. Therefore, these and other variations upon the exemplary embodiments are intended to be covered by the present invention.

What is claimed is:

1. A method comprising:
   receiving, by a digital device, network information associated with a network, the network information comprising an IP address;
   determining if the IP address is not part of a private non-routable address block and determining to generate a credential request including the IP address based on the determination that the IP address is not part of the private non-routable address block;
   generating an access identifier based on the network information based on the determination, the access identifier comprising an IP address;
   generating a credential request including the access identifier;
   providing the credential request including the access identifier to a credential server;
   receiving, by the digital device, a credential request response from the credential server, the credential request response comprising network credentials to access the network; and
   providing the network credentials to a network device to access the network.

2. The method of claim 1, wherein the access identifier comprises an SSID associated with the network.

3. A method comprising:
   receiving, by a digital device, network information associated with a network, wherein the network information comprises a URL and a location from XML data;
   formatting the URL and the location by selecting a domain from the URL, removing punctuation from the domain and the location, removing white space from the domain and the location, and truncating a combination of the URL and the location to a limited number of characters;
   generating an access identifier based on the network information, the access identifier comprising the formatted URL and location;
   generating a credential request including the access identifier;
   providing the credential request to a credential server;
   receiving, by the digital device, a credential request response from the credential server, the credential request response comprising network credentials to access the network; and
   providing the network credentials to a network device to access the network.

4. The method of claim 3, wherein the access identifier comprises an SSID associated with the network.

5. The method of claim 3, wherein the network information comprises a captive portal redirection page.

6. The method of claim 5, wherein the access identifier comprises at least a part of a URL from the captive portal redirection page.

7. The method of claim 5, wherein the access identifier comprises at least a part of a title from the captive portal redirection page.

8. The method of claim 1, wherein the network information comprises a captive portal redirection page.

9. The method of claim 8, wherein the access identifier comprises at least a part of a URL from the captive portal redirection page.

10. The method of claim 8, wherein the access identifier comprises at least a part of a title from the captive portal redirection page.

11. A system comprising:
    a processor configured to receive network information associated with a network, the network information comprising an IP address, determine if the IP address is not part of a private non-routable address block and determine to generate a credential request including the IP address based on the determination that the IP address is not part of the private non-routable address block, generate a credential request including an access identifier based on the determination, the access identifier comprising an IP address, provide the credential request including the access identifier to a credential server, receive a credential request response from the credential server, the credential request response comprising network credentials to access the network, and provide the network credentials to a network device to access the network; and
    an access ID module configured to generate an access identifier based on the network information.

12. The system of claim 1, wherein the access identifier based on the network information comprises an SSID associated with the network.

13. The system of claim 11, wherein the network information comprises a captive portal redirection page.

14. The system of claim 13, wherein the access identifier based on the network information comprises at least a part of a URL from the captive portal redirection page.

15. The system of claim 13, wherein the access identifier based on the network information comprises at least a part of a title from the captive portal redirection page.

16. The system of claim 11, wherein the network information comprises a captive portal redirection page.

17. The system of claim 16, wherein the access identifier based on the network information comprises at least a part of a URL from the captive portal redirection page.

18. The system of claim 16, wherein the access identifier based on the network information comprises at least a part of a title from the captive portal redirection page.

19. A system of comprising:
  a processor configured to receive network information associated with a network wherein the network information comprises a URL and a location from XML data, format the URL and the location by selecting a domain from the URL, remove punctuation from the domain and the location, remove white space from the domain and the location, truncate a combination of the URL and the location to a limited number of characters, generate a credential request including an access identifier, the access identifier comprising the formatted URL and location, provide the credential request to a credential server, receive a credential request response from the credential server, the credential request response comprising network credentials to access the network, and provide the network credentials to a network device to access the network; and
  an access ID module configured to generate an access identifier based on the network information.

20. The system of claim 19, wherein the access identifier based on the network information comprises an SSID associated with the network.

21. The system of claim 19, wherein the network information comprises a captive portal redirection page.

22. The system of claim 21, wherein the access identifier based on the network information comprises at least a part of a URL from the captive portal redirection page.

23. The system of claim 21, wherein the access identifier based on the network information comprises at least a part of a title from the captive portal redirection page.

24. A non-transitory computer readable medium, the computer readable medium comprising executable instructions, the instructions being executable by a processor to perform a method, the method comprising:
  receiving, by a digital device, network information associated with a network, the network information comprising an IP address;
  determining if the IP address is not part of a private non-routable address block and determining to generate a credential request including the IP address based on the determination that the IP address is not part of the private non-routable address block;
  generating an access identifier based on the network information based on the determination, the access identifier comprising an IP address;
  generating a credential request including the access identifier;
  providing the credential request including the access identifier to a credential server;
  receiving, by the digital device, a credential request response from the credential server, the credential request response comprising network credentials to access the network; and
  providing the network credentials to a network device to access the network.

25. The non-transitory computer readable medium of claim 24, wherein the access identifier comprises an SSID associated with the network.

26. The non-transitory computer readable medium of claim 24, wherein the network information comprises a captive portal redirection page.

27. The non-transitory computer readable medium of claim 26, wherein the access identifier comprises at least a part of a URL from the captive portal redirection page.

28. The non-transitory computer readable medium of claim 26, wherein the access identifier comprises at least a part of a title from the captive portal redirection page.

29. A non-transitory computer readable medium, the computer readable medium comprising executable instructions, the instructions being executable by a processor to perform a method, the method comprising:
  receiving, by a digital device, network information associated with a network, wherein the network information comprises a URL and a location from XML data;
  formatting the URL and the location by selecting a domain from the URL, removing punctuation from the domain and the location, removing white space from the domain and the location, and truncating a combination of the URL and the location to a limited number of characters;
  generating an access identifier based on the network information, the access identifier comprising the formatted URL and location;
  generating a credential request including the access identifier;
  providing the credential request to a credential server;
  receiving, by the digital device, a credential request response from the credential server, the credential request response comprising network credentials to access the network; and
  providing the network credentials to a network device to access the network.

30. The non-transitory computer readable medium of claim 29, wherein the access identifier comprises an SSID associated with the network.

31. The non-transitory computer readable medium of claim 29, wherein the network information comprises a captive portal redirection page.

32. The non-transitory computer readable medium of claim 31, wherein the access identifier comprises at least a part of a URL from the captive portal redirection page.

33. The computer readable medium of claim 31, wherein the access identifier comprises at least a part of a title from the captive portal redirection page.

* * * * *